United States Patent [19]

Libutti

[11] 3,886,261

[45] May 27, 1975

[54] ALUMINA AS A COLD-END ADDITIVE

[75] Inventor: Bruce L. Libutti, Bethayres, Pa.

[73] Assignee: Betz Laboratories Inc., Trevose, Pa.

[22] Filed: Nov. 1, 1973

[21] Appl. No.: 412,376

[52] U.S. Cl. .................................. 423/244; 55/23
[51] Int. Cl. ...... C01b 17/00; B01j 9/04; B01j 9/08; B01j 9/12; B01j 9/16; B01j 9/20
[58] Field of Search .......................... 423/242–244; 55/73, 74

[56] References Cited
UNITED STATES PATENTS
2,992,884   7/1961   Bienstock et al. ................. 423/244
FOREIGN PATENTS OR APPLICATIONS
3,443   1881   United Kingdom ................ 423/244

Primary Examiner—Oscar R. Vertiz
Assistant Examiner—Gregory A. Heller
Attorney, Agent, or Firm—Alexander D. Ricci

[57] ABSTRACT

The present invention is directed to a method of controlling the condensation of sulfur trioxide in flue gases to thereby inhibit the corrosion of metallic parts because of the sulfuric acid inherently formed. Basically, the requirements on the addition of particulate alumina ($Al_2O_3$) to the flue gas at a place where it is experiencing turbulence, and where its temperature is below 1000° F, and preferably within the range of 450° F. to 650° F.

4 Claims, No Drawings 3,886,261

ALUMINA AS A COLD-END ADDITIVE

BACKGROUND OF THE DISCLOSURE

As is well-known to boiler operators, sulfur containing fuels, whether it be coal or oil, do present problems not only from a pollutional point of view, i.e. acid smut, but also cause problems with respect to the useful life of metallic equipment and parts which are in contact with the flue gases containing the sulfur biproduct of combustion.

Basically, upon combustion the sulfur in the fuel is converted to sulfur dioxide and sulfur trioxide. When the sulfur trioxide reaches its temperature, it reacts with the moisture in the flue gas to produce the very corrosive sulfuric acid. The gases themselves are also particularly troublesome in their own right, since they are pollutional while the acid formed is damaging from the corrosion aspects.

As can be appreciated, the more sulfur contained in the fuel, the more the effects are disastrous. This is particularly the case in industrial and utility operations where low grade oils are used for combustion purposes.

Although many additives have been utilized for the purpose of conditioning flue gases, few additives have found overall success. The reason for the relatively little success in this area of application is felt to be the peculiarities found in the different combustion systems and boiler designs. The gas dynamics and the loads produced, sometimes make chemical treatments for the most part impractical, therefore, requiring a combination of mechanical and chemical treatment.

It was to this problem that the present inventor addressed himself, i.e. the problem of reducing acid smut and acid corrosion of metal parts utilizing a minimum of mechanical and chemical treatment.

The basic area to which the present invention is directed is often referred to in the industry as the "cold-end" of a boiler operation. This area is generalized as being the path in the boiler system that the combustion gas follows after the gas has, in fact, performed its service of heating water, producing steam and/or superheating steam.

In the larger boiler systems, the last stages through which the hot combustion gases flow include the economizer, the air heater, the collection equipment or the electrostatic precipitator, and then the stack through which the gas is discharged.

GENERAL DESCRIPTION OF THE INVENTION

The present inventor discovered that if alumina (Al$_2$O$_3$) was added to the combustion gases in particulate or powder form at a stage where the gas was undergoing great turbulence in the cold-end, the particulate alumina would, in fact, be carried along with the gas. However, it was determined that when the turbulence of the gas subsided, which occurs later in its path, the alumina particles deposit on the surfaces of the metallic structures which comprise the equipment found in the cold-end.

It is felt that because the alumina is mildly alkaline and highly adsorbtive, that which occurs is the adsorbtion of the sulfur trioxide.

Because of the adsorbtion and the alkalinity, an environment is produced which permits a reaction for the formation of the relatively harmless aluminum sulfate. Moreover, the dew point temperature for the sulfur trioxide is lowered substantially, thereby collectively yielding less deposition of sulfuric acid and correspondingly less corrosion of the metal parts. Also, there is a substantial reduction in acid smut.

In order to assure that effective results were attainable, it was ascertained that the alumina should preferably be added or fed to the combustion gases up stream of the air heater, and in a turbulent area. The alumina may be fed utilizing a vibrating gravimetric feeder to assure that discrete particles of the alumina are fed. The size of the particle of alumina should be 260 microns or less to insure the proper activity. The amount of alumina added is a function of the sulfur content of the fuel, and more specifically, the SO$_3$ (sulfur trioxide) produced upon combustion. Since a reaction is believed to occur, the fuel rates are based upon mole ratios to assure accuracy. Basically, it has been found that feed rates of 0.01 to 0.5 moles of alumina per mole of sulfur trioxide generated has been found to be most satisfactory, or on a pound basis, a feed rate of 0.01 to 0.516 of alumina per pound of SO$_3$ generated could be utilized.

In order to assess the efficacy of the discovery, removable deposition probes were inserted in the cold-end area of a utility boiler system where they were contacted with the sulfur trioxide containing flue gases.

Using this method, the amount of sulfuric acid deposited on the probes at particular temperatures experienced within the cold-end could be determined, for example, by titration of the condensed acid with a standardized sodium hydroxide.

Three separate sets of runs were conducted without the use of alumina. These runs were then followed with two separate sets of runs wherein the alumina was added. The results were as follows.

TABLE 1

Tabulation of H$_2$SO$_4$ deposition vs. temperature / Blank run (without treatment)

| Run 1 | | Run 2 | | Run 3 | |
|---|---|---|---|---|---|
| Temp, °F | Wt. H$_2$SO$_4$* | Temp, °F | Wt. H$_2$SO$_4$* | Temp, °F | Wt. H$_2$SO$_4$* |
| 401 | 0.90 | | | 420 | 0.41 |
| 391 | 0.85 | 370 | 0.40 | 416 | 0.30 |
| 390 | 0.58 | 366 | 0.29 | 416 | 0.43 |
| 373 | 0.81 | 352 | 0.45 | 405 | 0.43 |
| 352 | 1.35 | 345 | 0.65 | 399 | 0.30 |
| 350 | 1.35 | 334 | 0.63 | 400 | 0.41 |
| 323 | 2.33 | 316 | 0.85 | 387 | 0.27 |
| 321 | 2.15 | 302 | 0.99 | 377 | 0.41 |
| | | | | 361 | 0.44 |
| 315 | 2.33 | 289 | 1.80 | 342 | 0.44 |
| 301 | 2.15 | 272 | 2.04 | 321 | 1.10 |
| 285 | 2.92 | 270 | 2.22 | 330 | 1.40 |
| | | 212 | 2.51 | 254 | 2.00 |

TABLE 2

Tabulation of H₂SO₄ deposition vs. temperature
1.3 lb/hr (feed rate of Alumina product**)

| Run 4 | | Run 5 | |
|---|---|---|---|
| Temp. °F | Wt. H₂SO₄* | Temp. °F | Wt. H₂SO₄* |
| 373 | 0.42 | 346 | 0.44 |
| 367 | 0.42 | 345 | 0.27 |
| 355 | 0.30 | 323 | 0.44 |
| 345 | 0.55 | 317 | 0.55 |
| 345 | 0.45 | 310 | 0.55 |
| 342 | 0.38 | 292 | 0.70 |
| 333 | 0.55 | 280 | 0.70 |
| 325 | 0.55 | 265 | 0.44 |
| 307 | 0.55 | 252 | 0.84 |
| 300 | 0.55 | 234 | 0.72 |
| 269 | 0.70 | 234 | 0.80 |
| 215 | 0.85 | | |

8.6 lb/hr (feed rate of Alumina product**) Run 7
2.6 lb/hr (feed rate of Alumina product**) Run 6

| Run 7 | | Run 6 | |
|---|---|---|---|
| 356 | 0.44 | 345 | 0.30 |
| 352 | 0.44 | 330 | 0.44 |
| 345 | 0.47 | 322 | 0.66 |
| 330 | 0.65 | 320 | 0.63 |
| 327 | 0.87 | 292 | 0.70 |
| 322 | 1.20 | 275 | 0.90 |
| 290 | 1.10 | 263 | 1.10 |
| 282 | 0.91 | 252 | 1.10 |
| 267 | 0.98 | 230 | 1.20 |
| 250 | 1.12 | 224 | 1.30 |

*g. H₂SO₄ deposited on equal areas, per minute of exposure, × 10⁴
** Product comprise 50 % by weight alumina (particle size: 254 micron) and 50 % by weight Silica (improves flow of product)

1 hour after Run 7 was made, Run 8 was conducted, using no treatment to assess the difference, if any. The results of this Run are revealed in Table 3.

TABLE 3

| Run 8 | |
|---|---|
| Temp. °F | Wt. H₂SO₄ |
| 388 | 0.28 |
| 387 | 0.44 |
| 365 | 0.44 |
| 355 | 0.70 |

TABLE 3 — Continued

| Run 8 | |
|---|---|
| Temp. °F | Wt. H₂SO₄ |
| 353 | 0.63 |
| 330 | 0.70 |
| 315 | 1.00 |
| 297 | 1.20 |
| 280 | 1.40 |
| 260 | 1.30 |
| 202 | 1.70 |

It was conclusively illustrated by the studies that the addition of alumina to the flue gas successfully effected the amount of sulfuric acid deposited on the probes. Since corrosion rates are a direct function of the sulfuric acid deposited, it follows that corrosion had been inhibited to an acceptable degree.

Having thus described the invention, what is claimed is:

1. A method of reducing the amount of sulfur trioxide condensation on, and therefore the amount of sulfuric acid corrosion of, metal parts in contact with flue gases derived from the combustion of sulfur containing fuels which comprises adding to the flue gases at the cold-end of the combustion system where the gases are below 1000°F a particular alumina having a particle size of 260 microns or less, said alumina being added to the gas in an amount from about 0.01 to 0.5 moles of alumina per mole of sulfur trioxide generated.

2. A method according to claim 1 wherein the alumina is added to the flue gas at a place where the flue gas is in a turbulent state.

3. A method according to claim 1 wherein the temperature of the flue gas at the time of addition of the alumina is from about 650° to 450° F.

4. A method according to claim 3 wherein the alumina is added to the flue gas while said gas is in a turbulent state.

* * * * *